UNITED STATES PATENT OFFICE.

HEINRICH POLIKIER, OF BERLIN, GERMANY, ASSIGNOR TO ACTIEN-GESELL- SCHAFT FÜR ANILIN FABRIKATION, OF SAME PLACE.

VIOLET ACID DYE.

SPECIFICATION forming part of Letters Patent No. 684,457, dated October 15, 1901.

Application filed June 10, 1901. Serial No. 64,003. (No specimens.)

*To all whom it may concern:*

Be it known that I, HEINRICH POLIKIER, of Berlin, in the Kingdom of Prussia, German Empire, have invented new and useful Improvements in the Production of Violet Acid Dye; and I do hereby declare that the following is a full, clear, and exact description thereof, which will enable others skilled in the art to which it appertains to make and use the same.

It is known that derivatives of diphenyl-beta-naphthylmethane, owing to the fact that they contain a beta-naphthyl group, are easily converted by sulfonizing agents into new sulfonated dyestuffs remarkable for the purity and intensity of the tints they produce. On the other hand, until now it has been accepted that the corresponding derivatives of diphenyl-alpha-naphthylmethane do not yield any technically valuable products when similarly treated. I have now discovered that the derivatives of diphenyl-alpha-naphthylmethane obtained by condensing tetraalkyl-diamido-benzophenone with methylphenyl-alpha-naphthylamin can be sulfonated without difficulty and are thus transformed into acid dyestuffs which dye wool a remarkably pure and intense violet.

To further illustrate my invention, I give the following example: Twenty parts of the dyestuff obtained by condensing tetra-methyl-diamido-benzophenone with methylphenyl-alpha-naphthylamin, the so-called "Victoria-blue 4 R," are introduced into eighty parts of fuming sulfuric acid containing thirty per cent. of anhydride, care being taken that the temperature does not essentially exceed 20° centigrade. The mixture is then heated to 35° centigrade and kept at this temperature for about one hour until a test portion is found to dissolve completely in dilute ammonia. The liquid is now poured on ice, and the product after it has been separated by filtration is redissolved in water containing the equimolecular proportion of sodium carbonate, whereupon the sodium salt of the new sulfonic acid is precipitated. It forms in the dry state a red-violet powder easily soluble in water or alcohol to clear red-violet solutions. Its aqueous solution is precipitated by diluted hydrochloric acid, this precipitate, however, redissolving in an excess of the reagent to a green, or if the excess employed had been a large one to a yellowish-brown, solution. On the addition of caustic-soda lye the coloration of the aqueous solution changes to a somewhat-dull blue. The dyestuff dissolves easily in concentrated sulfuric acid to an orange-brown solution, which on gradual dilution with ice-water assumes a yellowish-brown, green, green-blue, and finally clear-blue coloration. It dyes wool clear-violet shades.

Having thus described my invention and in what manner the same is to be performed, what I claim is—

The new acid dye belonging to the diphenyl-naphthylmethane series, said dyestuff being a sulfonic acid of the condensation product obtained from tetraälkyldiamido-benzophenone and methylphenyl-alpha-naphthylamin, represented by the formula:

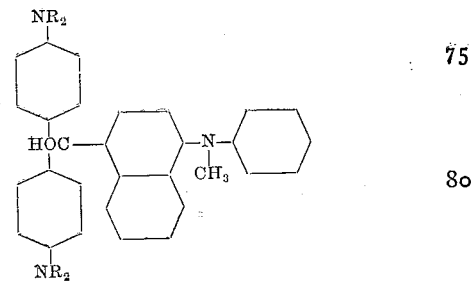

R meaning an alkyl group, said dye forming in the dry state a red-violet powder, easily soluble in water or alcohol to red-violet solutions; the aqueous solution being precipitated by diluted hydrochloric acid, this precipitate however redissolving in an excess of the reagent to a green, or, if the excess employed had been a large one, to a yellowish-brown solution, the coloration of the aqueous solution changing to a somewhat-dull blue on the addition of caustic-soda lye; the dye dissolving easily in concentrated sulfuric acid to an orange-brown solution which on gradual dilution with ice-water gets yellowish brown, green-blue and finally clear blue; the dye producing on wool clear-violet shades of great intensity.

In witness whereof I have hereunto signed my name, this 24th day of May, 1901, in the presence of two subscribing witnesses.

HEINRICH POLIKIER.

Witnesses:
 HENRY HASPER,
 WOLDEMAR HAUPT.